United States Patent
Bürkle

(10) Patent No.: US 12,006,131 B2
(45) Date of Patent: Jun. 11, 2024

(54) TWO-COMPONENT AEROSOL CAN

(71) Applicant: SIKA TECHNOLOGY AG, Baar (CH)

(72) Inventor: Jochen Bürkle, Steinheim an der Murr (DE)

(73) Assignee: SIKA TECHNOLOGY AG, Baar (CH)

( * ) Notice: Subject to any disclaimer, the term of this patent is extended or adjusted under 35 U.S.C. 154(b) by 310 days.

(21) Appl. No.: 16/767,341

(22) PCT Filed: Nov. 27, 2018

(86) PCT No.: PCT/EP2018/082637
§ 371 (c)(1),
(2) Date: May 27, 2020

(87) PCT Pub. No.: WO2019/102024
PCT Pub. Date: May 31, 2019

(65) Prior Publication Data
US 2020/0399051 A1  Dec. 24, 2020

(30) Foreign Application Priority Data
Nov. 27, 2017  (DE) .................. 10 2017 127 914.8

(51) Int. Cl.
*B65D 83/14*  (2006.01)
*B65D 83/66*  (2006.01)

(52) U.S. Cl.
CPC ................... *B65D 83/66* (2013.01)

(58) Field of Classification Search
CPC .... B65D 83/66; B65D 83/682; B65D 83/205; B65D 83/687

(Continued)

(56) References Cited

U.S. PATENT DOCUMENTS 3,096,001 A * 7/1963 Boe ............... B05B 7/1209
                                                261/DIG. 26
3,416,709 A * 12/1968 Shultz ............ B65D 83/682
                                                222/145.6

(Continued)

FOREIGN PATENT DOCUMENTS

DE   202009013510 U1   1/2010
EP      0111089 A2     6/1984
WO     02079291 A1    10/2002

OTHER PUBLICATIONS

Feb. 21, 2019 International Search Report issued in International Patent Application No. PCT/EP2018/082637.

(Continued)

*Primary Examiner* — Charles P. Cheyney
(74) *Attorney, Agent, or Firm* — Oliff PLC

(57) ABSTRACT

A two-component aerosol can for dispensing sealing and assembly foams based on isocyanates, having an outer pressure container which holds a prepolymer component and a propellant gas, the outer pressure container being in communication with a first valve device and with a first channel; an inner container which holds a curing component and a propellant gas, the inner container being in communication with a second valve device and with a second channel; and a spray head which comprises a device for simultaneously actuating the first and second valve devices; and a spray tube into which the first and second channels jointly open.

20 Claims, 2 Drawing Sheets

(58) Field of Classification Search
USPC .............................. 222/136, 145.6, 105, 135
See application file for complete search history.

(56) References Cited

U.S. PATENT DOCUMENTS

| | | | | |
|---|---|---|---|---|
| 3,439,840 | A * | 4/1969 | Frank, Jr. | B65D 83/60 222/464.1 |
| 3,454,198 | A * | 7/1969 | John | B65D 83/46 D9/449 |
| 3,465,918 | A * | 9/1969 | Milo | B65D 83/682 222/509 |
| 3,575,319 | A * | 4/1971 | Safianoff | B65D 83/682 222/459 |
| 4,019,657 | A * | 4/1977 | Spitzer | B65D 83/66 222/190 |
| 4,429,814 | A * | 2/1984 | Scotti | B65D 83/205 222/402.24 |
| 4,769,395 | A * | 9/1988 | Pauls | B65D 83/687 521/137 |
| 6,079,871 | A * | 6/2000 | Jonas | B01F 25/316 222/145.6 |
| 7,717,357 | B2 * | 5/2010 | Gantenbein | E04F 21/12 239/432 |
| 7,798,366 | B2 * | 9/2010 | Hoshino | B65D 83/62 222/105 |
| 8,839,994 | B2 * | 9/2014 | Mason | F16L 37/04 222/402.1 |
| 2002/0088724 | A1 * | 7/2002 | Morck | B65D 83/687 206/219 |
| 2002/0153633 | A1 * | 10/2002 | Ladang | C09K 3/1021 264/50 |
| 2014/0371349 | A1 * | 12/2014 | James-Burris | B05B 11/0081 239/304 |
| 2018/0104705 | A1 * | 4/2018 | Slutskii | B05B 1/02 |
| 2018/0272367 | A1 * | 9/2018 | Rayner | B65D 83/62 |
| 2019/0256277 | A1 * | 8/2019 | Lechner | C08G 18/4804 |
| 2021/0002063 | A1 * | 1/2021 | Bürkle | B65D 83/687 |
| 2022/0017678 | A1 * | 1/2022 | Ohara | C08K 5/0066 |

OTHER PUBLICATIONS

Jun. 2, 2020 International Preliminary Report on Patentability issued in International Patent Application No. PCT/EP2018/082637.

* cited by examiner

TWO-COMPONENT AEROSOL CAN

TECHNICAL FIELD

The invention relates to a two-component aerosol can for dispensing sealing and assembly foams based on isocyanates, having an outer pressure container which holds a prepolymer component and a propellant gas, the outer pressure container being in communication with a first valve device and with a first channel; an inner container which holds a curing component and a propellant gas, the inner container being in communication with a second valve device and with a second channel; and a spray head which comprises a device for simultaneously actuating the first and second valve devices; and a spray tube into which the first and second channels jointly open.

BACKGROUND

Two-component pressurized cans for dispensing sealing and assembly foams are known in a multiplicity of embodiments. The sealing and assembly foams here are formed from a polyisocyanate-based prepolymer component and from a curing component, leading to the crosslinking of the polyisocyanate groups of the prepolymer component. Usually the prepolymer component consists of a polyisocyanate based on MDI (diphenylmethane diisocyanate), TDI (toluene diisocyanate) or HDI (hexamethylene diisocyanate), which has been reacted with a polyol, as for instance a polyether polyol or a polyester polyol, with reactive isocyanate groups remaining in the prepolymer. An example of a curing agent used is a polyol, for instance a glycol, more particularly ethylene glycol. The prepolymer component here is held in the actual pressurized can, and the curing component in a separate inner container, which is either opened before use in the pressurized can or else is outwardly discharged via a separate valve mechanism. In the latter case, the mixing of prepolymer and curing agent takes place outside the pressurized can, usually in an application tube.

The pressurized can holds not only the prepolymer but also propellant gas, which serves first to dispense the prepolymer from the pressurized can and secondly for foaming. In addition there are customary adjuvants, such as flame retardants, foam stabilizers, and catalysts.

Located in the inner container is the curing agent, usually together with a catalyst. If the inner container is opened into the pressurized can, there may be no need for a propellant. If the inner container is discharged via a separate valve, the inner container also holds propellant gas.

Two-component aerosol cans which have an inner container whose contents are released in the interior of the pressurized can, where they mix with the prepolymer, have the disadvantage that the reaction that then ensues requires that the mixture be dispensed within a short time. The mixture reacts, with heating, to form a completed polymer, which can no longer be dispensed. The period within which the mixture can still be dispensed amounts to 20 minutes at maximum.

The time limit can be avoided if the pressurized can and the inner container possess separate valves, which can be triggered jointly. In that case the two components are only mixed outside the pressurized can. The mixture hardens outside the pressurized can, at the deployment site. The pressurized can itself remains ready for use; even after partial discharge, the contents of the pressurized can and those of the inner container as well retain an unaltered reactivity.

Pressurized cans of this kind with two valves, as described in EP 0 111 089 B1, for example, are known per se and are established. Such an aerosol can that allows external mixing is illustrated in FIG. 1. A container 8 is installed in a commercially available aerosol can 9. It consists of aluminum and is screwed to the valve disk 7. The valve body 5 leads to the inner container, the valve body 6 into the aerosol can. Two-component products can be filled into the aerosol can and are divided into two chambers. As soon as the spray head 1 is pressed downwards, the valve bodies 5 and 6 are opened and the two partial fillings flow through the separate channels 2 and 3 in the spray head 1. In a connected spray pipe 4, they are mixed and applied.

A disadvantage, however, is that the foams they generate frequently do not have the ideal composition, because the valves are unable to ensure the exact mixing ratio of prepolymer and curing agent. This does not matter if the dispensing rate for the curing component is set such that the curing agent is present in excess and completely satisfies the free isocyanate groups of the prepolymer. Where, however, the desire is for an isocyanate excess in the mixture dispensed, it is necessary to limit the dispensing rate for the curing component.

On the other hand it is rational to use identical valves for prepolymer component and curing component, in order to ensure uniform triggering.

Another problem is the tendency of the foams thus generated to contract after having been dispensed at the deployment site. The contraction, while amounting to only a few percent by volume, may nevertheless represent a great disadvantage at locations where an impervious seal is important.

SUMMARY

It would be desirable, therefore, to have a two-component aerosol can and an assembly foam which on the one hand precisely control the dispensing rate for the two components and on the other hand prevent the contraction of the finished foam.

This object is achieved with an aerosol can, of the type specified at the outset, for which the second valve device or the second channel comprises a throttle element which tailors the dispensing rate for the curing component to that for the prepolymer component, the curing component not being sufficient to satisfy the isocyanate groups of the prepolymer component, in such a way that in the mixture of the prepolymer component and curing component dispensed there is an isocyanate excess of more than 3 wt %, based on the weight of the mixture.

DETAILED DESCRIPTION

Figure 1:
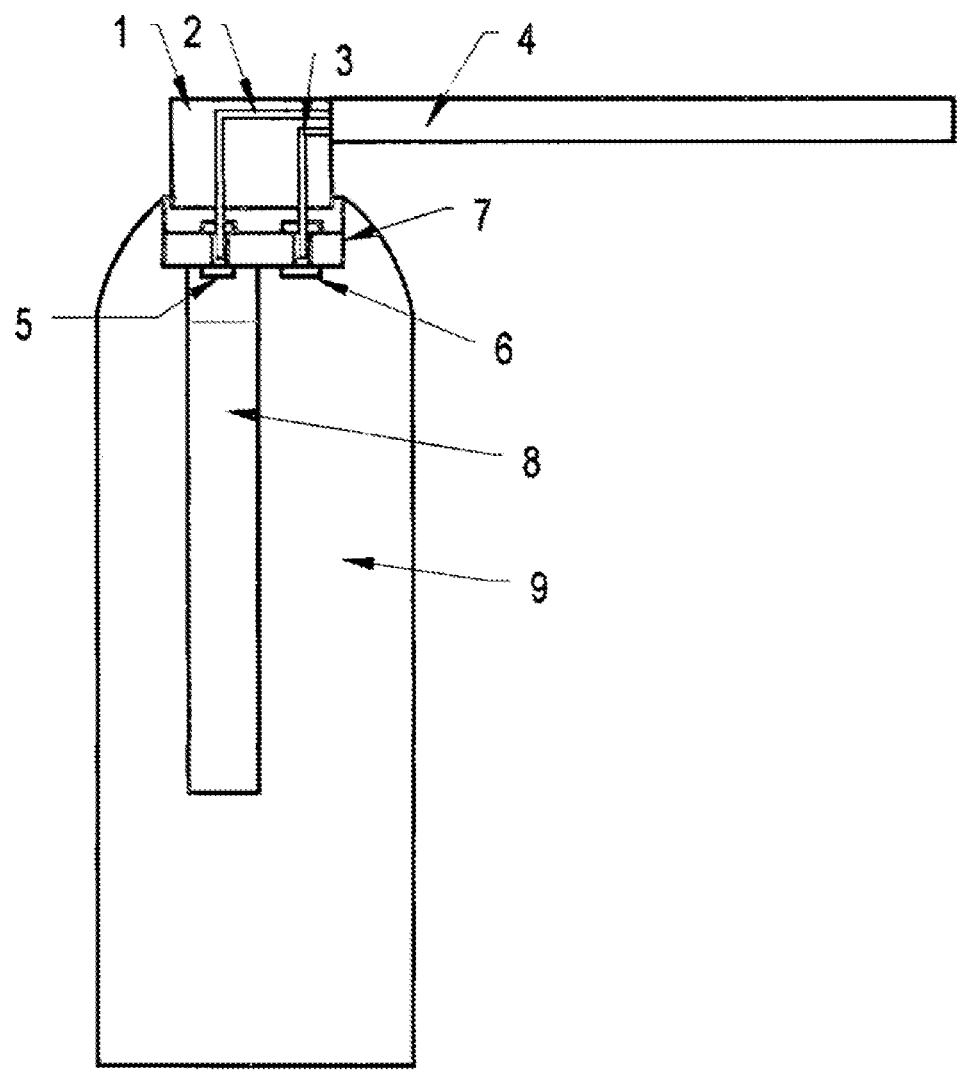
FIG. 1 illustrates a related art aerosol can.
Figure 2:
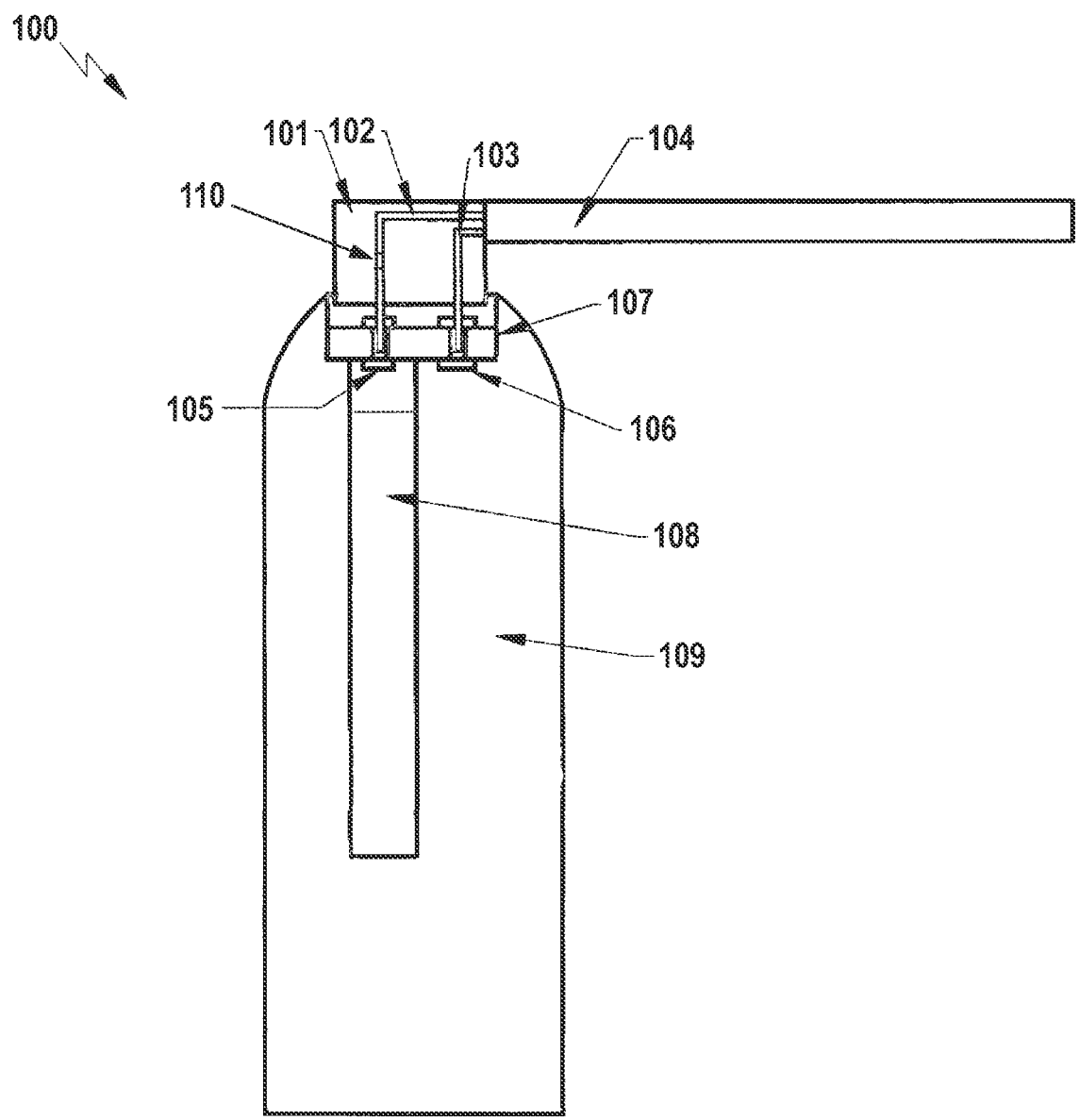
FIG. 2 illustrates an aerosol can according to an embodiment.

A pressurized can 100 according to disclosed embodiments is illustrated in FIG. 2. A container 108 is installed in aerosol can 109 and is screwed to the valve disk 107. The valve body 105 leads to the inner container, the valve body 106 into the aerosol can. Two-component products can be filled into the aerosol can and are divided into two chambers. As soon as the spray head 101 is pressed downwards, the valve bodies 105 and 106 are opened and the two partial fillings flow through the separate channels 102 and 103 in the spray head 101. In a connected spray pipe 104, they are mixed and applied.

By isocyanate excess is meant the weight fraction of the isocyanate group as a proportion of the weight of the mixture dispensed.

The prepolymers employed in the aerosol can of the invention are those with a customary basis, as are prepared, for example, from MDI (diphenylmethane diisocyanate) and polyether polyol. Important in this case is the excess of free NCO groups, which is for example in the range from 15 to 20 wt %, based on the prepolymer. The prepolymer is held in the outer pressure container of the aerosol can and is admixed with propellant gas, as for example with 1,1-difluoroethane (R152a), 1,1,2,2-tetrafluoroethane (R134a), propane, butane or dimethyl ether. It is also possible to use propellant gas mixtures, for instance propane/butane/dimethyl ether, optionally with addition of R152a and/or R134a. The outer pressure container, furthermore, may hold customary adjuvants, examples being foam stabilizers, flame retardants, catalysts, and the like.

The curing component is located in the inner container and comprises a polyol, as for instance glycol or diethylene glycol. Additionally present is a customary catalyst which brings about crosslinking with the prepolymer, and also propellant gas. It may be useful to add a dye to the curing component, which in the dispensed product indicates the activation of the inner container.

The inner container preferably holds the same propellant gas as the outer pressure container and, accordingly, has the same pressure. Where the inner container consists of a polyolefin, as is preferred, there is also automatically an exchange of propellant gas and a pressure compensation through the wall.

The outer pressure container is in communication via a first valve with the first channel in the spray head of the aerosol can, and the first channel opens into a spray tube.

The inner container is in communication via a separate second valve with the second channel in the spray head of the aerosol can. The two valves here are located in a valve plate which is gastightly arranged in the dome of the can. The inner container here is gastightly mounted on the underside of the valve plate, below the second valve. Reference is made, by way of example, to EP 0 111 089. The arrangement of both valves in the valve plate permits simultaneous triggering.

The spray head at the same time contains a device for simultaneous actuation of the two valves. For this purpose the spray head is mounted in a vertically movable way on the valve plate and is able to press the valves in for triggering, with the aid of the channels which are arranged in the valve head and which engage around the upper edge of the stent of each valve. The two channels open into a spray tube, in which the two components are combined. The valves, in a known way, have a vertically movable stem which when pressed opens up the valve passage.

For reasons of cost and in order to enable uniform opening, the first and second valves are identical in design. However, since the dispensing rate for the curing component must be lower than that of the prepolymer component—the quantitative ratio of prepolymer component to curing component is in the range from 15:1 up to 5:1 and more particularly is about 10:1—there is a throttle element 110 (shown in FIG. 2) located in the dispensing pathway of the curing component, advantageously in the second channel. The throttle function may be served, for example, by a smaller cross section of the second channel, a narrowing in the second channel, a pin which partially closes the exit in the second valve, or else a longer passage of the second channel in comparison to the first channel. In that case the two components are only mixed in the spray tube, which, for the purpose of producing a homogeneous mixture, may be equipped with a forced mixing element, for instance a static mixer. Forced mixers suitable for this purpose are known per se. Adequate mixing, however, may also be achieved without forced mixers.

A residual content of isocyanate in the dispensed mixture is essential to the invention. This residual content ought to be more than 3 wt %, based on the mixture including propellant gas, and more particularly 5 to 13 wt %. An isocyanate excess of 10 to 12 wt % is preferred.

The effect of the excess of free isocyanate in the mixture dispensed, under the influence of moisture, more particularly of atmospheric moisture, is a post-expansion of the foam, causing it to conform particularly well to the walls in joints and openings. In the case of reactive surfaces, there is reactive attachment of the sealing foam. In the case of smooth surfaces not offering any good hold, the use of a primer may be useful. For this reason, the sealing and assembly foam generated in the invention can be employed particularly well for the sealings of joints and openings. Watertight closures are developed, with a pressure resistance of more than 1.5 bar.

The foam may be deployed, for example, for the water-resistant sealing of pipes (especially disused pipes in buildings), of leadthroughs, shaft rings, well caps, and also door and window connection joints. One preferred application is the closure of empty pipes which are installed and laid (in newbuilds, for example) for the purpose of converting cable looms and the like.

In the testing method, pipe closures with sealing foams dispensed in accordance with the invention were tested at 1.5 bar. The closures proved to be airtight and watertight for much more than 120 hours.

The invention claimed is:

1. A two-component aerosol can for dispensing sealing and assembly foams based on isocyanates, the can comprising:
    an outer pressure container configured to hold a prepolymer component and a propellant gas, the outer pressure container being in communication with a first valve device and with a first channel disposed downstream of the first valve device in a flow direction of the prepolymer component;
    an inner container configured to hold a curing component and a propellant gas, the inner container being in communication with a second valve device and with a second channel disposed downstream of the second valve device in a flow direction of the curing component;
    a spray head comprising a device for simultaneously actuating the first and second valve devices; and
    a spray tube disposed on the spray head and into which the first and second channels passing through the spray head jointly open in the flow directions, the spray tube configured to form a mixture by mixing the prepolymer component and the curing component dispensed from the spray head;
    wherein the second valve device or the second channel comprises a throttle element configured to control a dispensing rate of the curing component and the prepolymer component, such that the dispensing rate for the curing component is lower than that of the prepolymer component and a quantitative ratio of the prepolymer component to the curing component in the spray tube is in a range 15:1 to 5:1, the curing component is not sufficient to satisfy the isocyanate groups of the prepolymer component, such that in the mixture of the prepolymer component and the curing component dispensed there is an isocyanate excess of more than 3 wt %, based on the weight of the mixture, the throttle is selected from the group consisting of a smaller cross section of the second channel, a narrowing in the second channel, a pin which partially closes an exit in the second valve, and a longer passage of the second channel in comparison to the first channel, the propellant gas held in the outer pressure container is the same as the propellant gas held in the inner container, a pressure of the propellant gas held in the outer pressure container is the same as a pressure of the propellant gas held in the inner container, and a wall of the inner container is configured to allow an exchange of the propellant gases between the inner container and the outer pressure container.

2. The aerosol can as claimed in claim 1, wherein the throttle element is integrated in the second channel.

3. The aerosol can as claimed in claim 1, wherein the excess of isocyanate groups is 5 to 13 wt %.

4. The aerosol can as claimed in claim 3, wherein the isocyanate excess in the mixture is 8 to 12 wt %.

5. The aerosol can as claimed in claim 1, wherein the outer pressure container and the inner container hold the same propellant gas.

6. The aerosol can as claimed in claim 5, wherein the propellant gas is 1,1-difluoroethane (R152a), tetrafluoroethane (R134a), propane, butane, dimethyl ether, or a mixture of at least two of these propellant gases.

7. The aerosol can as claimed in claim 1, wherein the spray tube is a forced mixer.

8. A method for pressure-resistance sealing using a two-component aerosol can for dispensing sealing and assembly foams based on isocyanates, the method comprising:
providing an aerosol can comprising:
an outer pressure container configured to hold a prepolymer component and a propellant gas, the outer pressure container being in communication with a first valve device and with a first channel disposed downstream of the first valve device in a flow direction of the prepolymer component,
an inner container configured to hold a curing component and a propellant gas, the inner container being in communication with a second valve device and with a second channel disposed downstream of the second valve device in a flow direction of the curing component,
a spray head comprising a device for simultaneously actuating the first and second valve devices, and
a spray tube disposed on the spray head and into which the first and second channels passing through the spray head jointly open in the flow directions, the spray tube configured to form a mixture by mixing the prepolymer component and the curing component dispensed from the spray head,
wherein the second valve device or the second channel comprises a throttle element configured to control a dispensing rate of the curing component and the prepolymer component, the curing component is not sufficient to satisfy the isocyanate groups of the prepolymer component, such that in a mixture of the prepolymer component and the curing component dispensed there is an isocyanate excess of more than 3 wt %, based on the weight of the mixture, the throttle is selected from the group consisting of a smaller cross section of the second channel, a narrowing in the second channel, a pin which partially closes an exit in the second valve, and a longer passage of the second channel in comparison to the first channel, the propellant gas held in the outer pressure container is the same as the propellant gas held in the inner container, a pressure of the propellant gas held in the outer pressure container is the same as a pressure of the propellant gas held in the inner container, and a wall of the inner container is configured to allow an exchange of the propellant gases between the inner container and the outer pressure container; and controlling the dispensing rate of the curing component and the prepolymer component, such that the dispensing rate for the curing component is lower than that of the prepolymer component and the quantitative ratio of the prepolymer component to the curing component in the spray tube is in the range 15:1 to 5:1.

9. A method for pressure-resistance sealing as claimed in claim 8, wherein the joints and openings withstand an overpressure of at least 1.5 bar.

10. A method for pressure-resistance sealing as claimed in claim 8, wherein the sealing performed on empty pipes for cable laying.

11. A method for pressure-resistance sealing as claimed in claim 8, wherein the sealing is performed on pipes against ingress or egress of water.

12. The aerosol can as claimed in claim 1, wherein a seal formed by the mixture is airtight and watertight for more than 120 hours at 1.5 bar.

13. A method for pressure-resistance sealing as claimed in claim 8, further comprising performing pressure-resistant sealing of joints and openings with a seal formed by the mixture using the aerosol can, the seal being airtight and watertight for more than 120 hours at 1.5 bar.

14. The aerosol can as claimed in claim 1, wherein the throttle is the smaller cross section of the second channel.

15. The aerosol can as claimed in claim 1, wherein the throttle is the narrowing in the second channel.

16. The aerosol can as claimed in claim 1, wherein the throttle is the pin which partially closes the exit in the second valve.

17. The aerosol can as claimed in claim 1, wherein the throttle is the longer passage of the second channel in comparison to the first channel.

18. The aerosol can as claimed in claim 1, wherein the wall of the inner container comprises a polyolefin.

19. The aerosol can as claimed in claim 1, wherein the inner container is composed of a material consisting of a polyolefin.

20. The aerosol can as claimed in claim 4, wherein the isocyanate excess in the mixture is 10 to 12 wt %.

* * * * *